US012068561B2

(12) United States Patent
Kim et al.

(10) Patent No.: US 12,068,561 B2
(45) Date of Patent: Aug. 20, 2024

(54) CABLE ADAPTOR

(71) Applicants: SENSORVIEW CO., LTD., Gyeonggi-do (KR); okins electronics Co., Ltd, Gyeonggi-do (KR); Hyun Duk Kim, Gyeonggi-do (KR)

(72) Inventors: Byoung Nam Kim, Gyeonggi-do (KR); Kyoung Il Kang, Gyeonggi-do (KR); Jin Woo Lee, Chungcheongnam-do (KR); Jin Kook Jun, Gyeonggi-do (KR); Sung Gyu Park, Gyeonggi-do (KR); Hyun Duk Kim, Gyeonggi-do (KR); Jong Wook Ham, Gyeonggi-do (KR); Sang Woo Han, Gyeonggi-do (KR)

(73) Assignees: SENSORVIEW CO., LTD., Gyeonggi-do (KR); OKINS ELECTRONICS CO., LTD, Gyeonggi-do (KR); Hyun Duk Kim, Gyeonggi-do (KR)

( * ) Notice: Subject to any disclaimer, the term of this patent is extended or adjusted under 35 U.S.C. 154(b) by 374 days.

(21) Appl. No.: 17/723,605

(22) Filed: Apr. 19, 2022

(65) Prior Publication Data

US 2022/0337008 A1 Oct. 20, 2022

(30) Foreign Application Priority Data

Apr. 19, 2021 (KR) ........................ 10-2021-0050652

(51) Int. Cl.
*H01R 9/05* (2006.01)
*H01R 24/00* (2011.01)
*H01R 31/06* (2006.01)

(52) U.S. Cl.
CPC ........... *H01R 31/06* (2013.01); *H01R 24/005* (2013.01)

(58) Field of Classification Search
CPC .... H01R 31/06; H01R 24/005; H01R 13/111; H01R 13/2428; H01R 24/44; H01R 24/542
See application file for complete search history.

(56) References Cited

U.S. PATENT DOCUMENTS 5,695,363 A * 12/1997 Micheletti .......... H01R 13/6397 439/578
6,275,054 B1 * 8/2001 Boyle .................... H01R 24/44 324/755.05

(Continued)

FOREIGN PATENT DOCUMENTS

JP 2009-052913 A 3/2009
JP 2009-527874 A 7/2009

(Continued)

OTHER PUBLICATIONS

Office Action from corresponding Taiwanese Patent Application No. 11220366330, dated Apr. 20, 2023.

(Continued)

*Primary Examiner* — Abdullah A Riyami
*Assistant Examiner* — Nelson R. Burgos-Guntin
(74) *Attorney, Agent, or Firm* — Harness, Dickey & Pierce, P.L.C.

(57) ABSTRACT

Disclosed is a cable adaptor which is connected to a cable including an outer conductor. The adaptor includes a contact pin which comes into contact with a signal pin of the cable, a first member which is conductive and disposed inside and coupled to the contact pin, a second member disposed outside and coupled to the contact pin, and a third member which is conductive and disposed outside the second member. Here, the contact pin includes a first body coupled to the second member, a first contact portion which is conductive and extends from one side of the first body to come into contact with the signal pin, and a second contact portion (Continued)

which extends from the other side of the first body and comes into contact with an object being tested. The third member includes a second body coupled to the second member and a third contact portion.

8 Claims, 17 Drawing Sheets

(56) References Cited

U.S. PATENT DOCUMENTS

| | | | | |
|---|---|---|---|---|
| 7,335,065 | B1 * | 2/2008 | Chen | H01R 24/40 439/654 |
| 7,500,873 | B1 * | 3/2009 | Hart | H01R 13/025 439/63 |
| 8,702,456 | B1 | 4/2014 | Wang | |
| 10,049,788 | B1 * | 8/2018 | Maturo | H01R 24/42 |
| 10,439,323 | B1 * | 10/2019 | Higgins | H01R 13/502 |
| 10,535,964 | B1 * | 1/2020 | Yan | H02G 15/115 |
| 2005/0140459 | A1 * | 6/2005 | Tanbakuchi | H01R 24/542 333/4 |
| 2010/0015849 | A1 * | 1/2010 | Lee | H01R 24/44 439/578 |
| 2013/0157487 | A1 * | 6/2013 | Heebe | H01R 31/06 439/153 |
| 2014/0041212 | A1 * | 2/2014 | Penumatcha | H01R 43/26 29/748 |
| 2018/0351311 | A1 * | 12/2018 | Maturo | H01R 13/6315 |
| 2019/0074630 | A1 * | 3/2019 | Burrow | H01R 13/622 |
| 2019/0252827 | A1 * | 8/2019 | Maturo | G06N 10/00 |

FOREIGN PATENT DOCUMENTS

| | | | |
|---|---|---|---|
| KR | 2000-0011531 | A | 2/2000 |
| KR | 10-2011-0082560 | A | 7/2011 |
| TW | M563680 | U | 7/2018 |

OTHER PUBLICATIONS

Office Action from corresponding Korean Patent Application No. 10-2021-0050652, dated Jul. 1, 2022.

* cited by examiner

CABLE ADAPTOR

CROSS-REFERENCE TO RELATED APPLICATION

This application claims the benefit of Korean Patent Application No. 10-2021-0050652, filed on Apr. 19, 2021, in the Korean Intellectual Property Office, the disclosure of which is incorporated herein in its entirety by reference.

FIELD

Embodiments relate to a cable adaptor, and more particularly, to an adaptor for electrically connecting a cable to an object being tested while maintaining a common axis with the cable.

BACKGROUND

For equipment performance evaluation, an adaptor which comes into electrical contact with equipment is connected to a cable. The adaptor needs not only to mechanically and electrically connect a signal pin of the cable but to also satisfy impedance matching conditions with an object being tested.

Meanwhile, the cable may include a separate outer conductor for grounding or shielding. Also, for grounding, the adaptor includes a structure for contact with the outer conductor. In the structure of the adaptor, a grounding structure of the adaptor may be implemented in a clip form which comes into elastic contact with the outer conductor of the cable.

However, since the adaptor having the above structure has the clip-form grounding structure with the outer conductor of the cable which pressurizes the cable in one direction, there is a problem that the adaptor has a difficulty in being coaxially connected to the outer conductor of the cable. When the adaptor and the outer conductor of the cable are not coaxially connected to each other, there is a serious difficulty in impedance matching with the object being tested.

Also, generally, the adaptor installed on the signal pin of the cable comes into electrical contact with the signal pin only in one direction, and thus the signal pin of the cable and the adaptor are not coaxially connected. Accordingly, there is a serious difficulty in impedance matching between the adaptor and the signal pin of the cable.

RELATED ART DOCUMENT

Patent Document

Patent Document 0001: Korean Patent Publication No. 2000-0011531

SUMMARY OF THE INVENTION

The present invention is directed to providing a cable adaptor which is capable of being coaxially connected to an outer conductor and a signal line of a cable.

Aspects of the present invention are not limited to the above-stated aspect and other unstated aspects of the present invention will be understood by those skilled in the art from the following disclosure.

According to an aspect of the present invention, there is provided a cable adaptor which is connected to a cable including an outer conductor. The adaptor includes a contact pin which comes into contact with a signal pin of the cable, a first member which is conductive and disposed inside and coupled to the contact pin, a second member disposed outside and coupled to the contact pin, and a third member which is conductive and disposed outside the second member. Here, the contact pin includes a first body coupled to the second member, a first contact portion which is conductive and extends from one side of the first body to come into contact with the signal pin, and a second contact portion which extends from the other side of the first body and comes into contact with an object being tested. The third member includes a second body coupled to the second member and a third contact portion which extends from the second body and comes into contact with the outer conductor. A plurality of first contact points of the signal pin and the first contact portion are arranged at same intervals along a circumferential direction of the signal pin. A plurality of second contact points of the outer conductor and the third contact portion are arranged at same intervals along a circumferential direction of the outer conductor.

The plurality of first contact points may be arranged at same positions in a longitudinal direction of the signal pin, and the plurality of second contact points may be arranged at same positions in a longitudinal direction of the outer conductor.

The first contact portion may include a first ring-shaped frame and a plurality of first legs which extend from the first ring-shaped frame and are connected to the first body. The plurality of first legs may be bent and may come into elastic contact with the signal pin at the first contact points. The third contact portion may include a second ring-shaped frame and a plurality of second legs which extend from the second ring-shaped frame and are connected to the second body. Also, the plurality of second legs may be bent and may come into elastic contact with the outer conductor at the second contact points.

The first member may include an upper ring and a lower ring which come into contact with an inner surface of the contact pin and a plurality of columns arranged at same intervals in a circumferential direction while connecting the upper ring to the lower ring.

The second body may include a plurality of spiral elastic pieces which extend from a lower surface of the second body and are disposed to be spaced apart from the lower surface of the second body.

The second contact portion may include an elastic portion which provides a restoring force at the time of contracting and a tip portion which extends from the elastic portion and comes into contact with the object being tested.

The second member may include a slot portion concavely formed in an outer surface of the second member along a longitudinal direction of the second member. Also, the third member may include a protrusion which protrudes from an inner surface of the third member and is disposed in the slot portion.

The slot portion may include a first slot and a second slot. Here, the first slot and the second slot may be alternately arranged along a circumferential direction of the second member. Also, an inlet of the first slot may be opposite to an inlet of the second slot on the basis of a longitudinal direction.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

The purpose, particular advantages, and novel features will be more clarified from exemplary embodiments and the following detailed description related to the attached drawings. Also, the terms or words used in the specification and the claims should not be limited to general or lexical meanings and should be construed as meanings and concepts coinciding with the technical concept of the present invention on the basis of a principle that the inventor can appropriately define the concepts of the terms to explain the invention in the best way. Also, in description of the present invention, detailed description of well-known arts related to the present invention will be omitted when it is deemed to unnecessarily obscure the essentials of the present invention.

Also, in describing components of the embodiment of the present invention, terms such as "first," "second," "A," "B," and the like may be used. These terms are merely for distinguishing one element from another, and the essential, order, sequence, and the like of corresponding elements are not limited by the terms.

Figure 1:
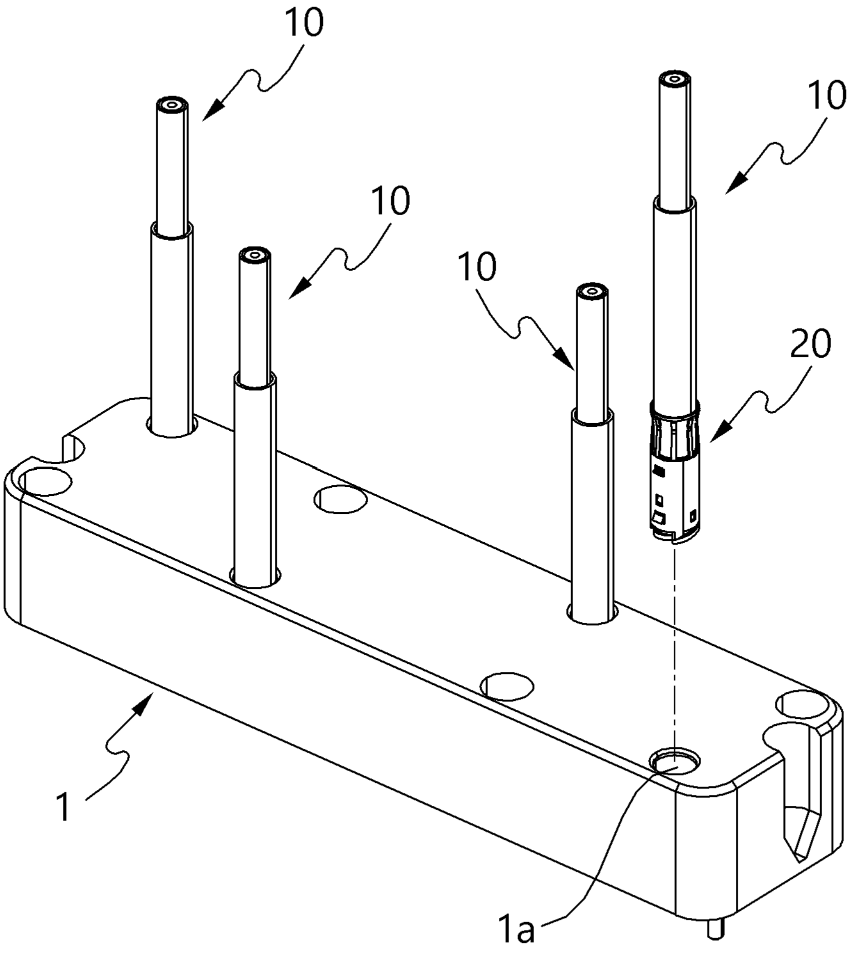
FIG. 1 is a perspective view illustrating an assembly in which adaptors to which assembly cables are fastened are arranged.

FIG. 1 is a perspective view illustrating an assembly in which adaptors 20 to which cables are fastened are arranged according to an embodiment.

Hereinafter, in describing the embodiment, a "longitudinal" direction is shown as a z-axis in the drawings, which refers to a direction in which the cable and the adaptor are coupled, and a direction perpendicular to the z-axis is shown as a y-axis in the drawings. Hereinafter, a circumferential direction is based on a center of the cable.

A plurality of such adaptors 20 may be arranged at certain intervals on a base 1. In FIG. 1, only some of the plurality of adaptors 20 arranged on the base 1 may be shown. The base 1 may include a plurality of holes 1*a* passing through an upper surface and a lower surface. The adaptors 20 may be inserted into the holes 1*a*, respectively. An assembly cable 10 is connected to the adaptor 20. The adaptor 20 comes into contact with an object being tested. The adaptor 20 electrically connects the assembly cable 10 to the object being tested. The object being tested may be an electronic device such as a semiconductor chip.

In one or more embodiments, in an assembly sequence, the adaptor 20 may be mounted on the base 1 and then the cable 10 may be fastened to the adaptor 20. Here, the adaptor 20 may be inserted into the base 1 from top to bottom in a z-axis direction to be assembled or may be inserted into the base 1 from bottom to top to be assembled. While the adaptor 20 is assembled with the base 1, the cable 10 may be inserted into the adaptor 20 from top to bottom in the z-axis direction to be assembled.

Since the assembly cable 10 shown in the drawing is merely an example of assembly cables which the adaptor 20 of the present invention can accommodate, the present invention is not limited to a configuration of the cable 10 and the adaptor 20 of the present invention may accommodate a variety of types of assembly cables.

In one or more embodiments, a tubular outer conductor 12 may be exposed outside the assembly cable 10. The outer conductor 12 may be a metal member which functions as a shield. Here, the cable 10 may be a coaxial cable. The cable 10 may include a signal line 13 in the innermost part, a dielectric 14 which surrounds the signal line 13, a conductor 15 which surrounds the dielectric 14, and an outer cover 16 which surrounds the conductor 15. The signal line 13 may be exposed externally from one end of the cable 10, and the externally exposed signal line 13 may be inserted into a signal pin 11. The conductor 15 and the outer cover 16 are partially removed from the cable 10 so that the dielectric 14 may be exposed. Here, a cylindrical connecting conductor 17 which surrounds the exposed dielectric 14 may be included. Since the conductor 15 of the cable 10 may come into contact with the connecting conductor 17 on one end, the conductor 15 may be electrically connected to the outer conductor 12 which surrounds the connecting conductor 17. Also, an annular insulator 18 which prevents contact between the signal line 11 and the connecting conductor 17 may be provided, in a longitudinal direction, between the signal pin 11 and the connecting conductor 17. An insulator block 19 which supports the signal pin 11 against the outer conductor 12 may be installed on an outer circumference of the signal pin 11. However, this is merely an embodiment and the configuration of the cable 10 is not limited thereto.

Figure 2:
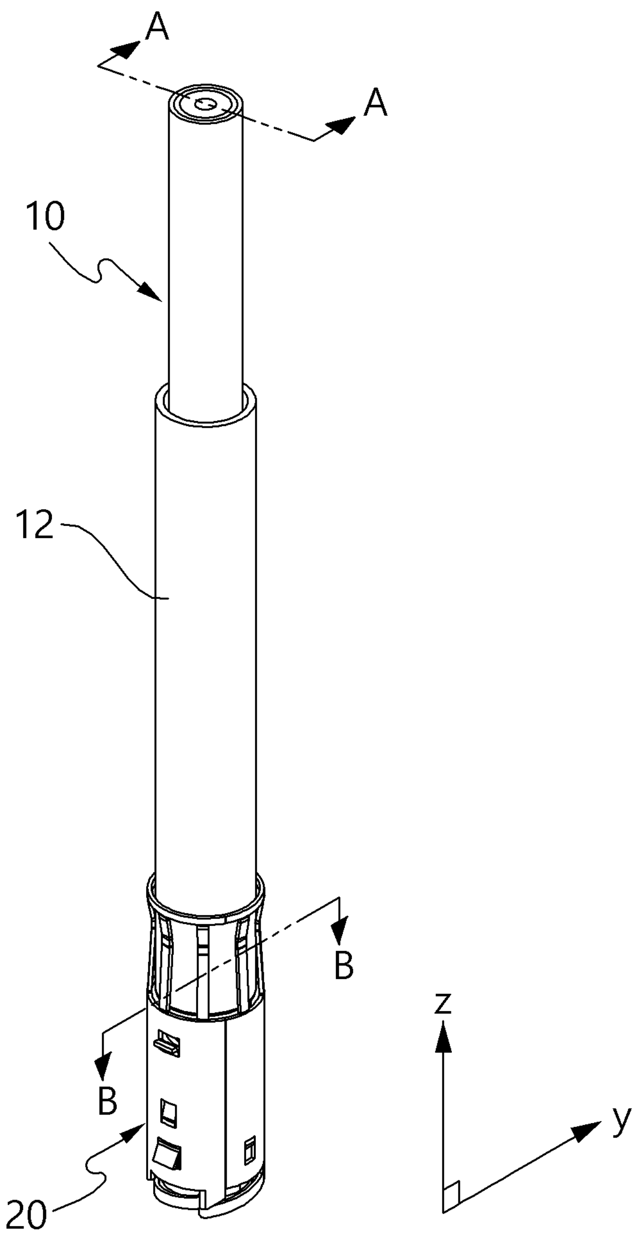
FIG. 2 is a perspective view illustrating the adaptor to which the assembly cable is fastened.
Figure 3:
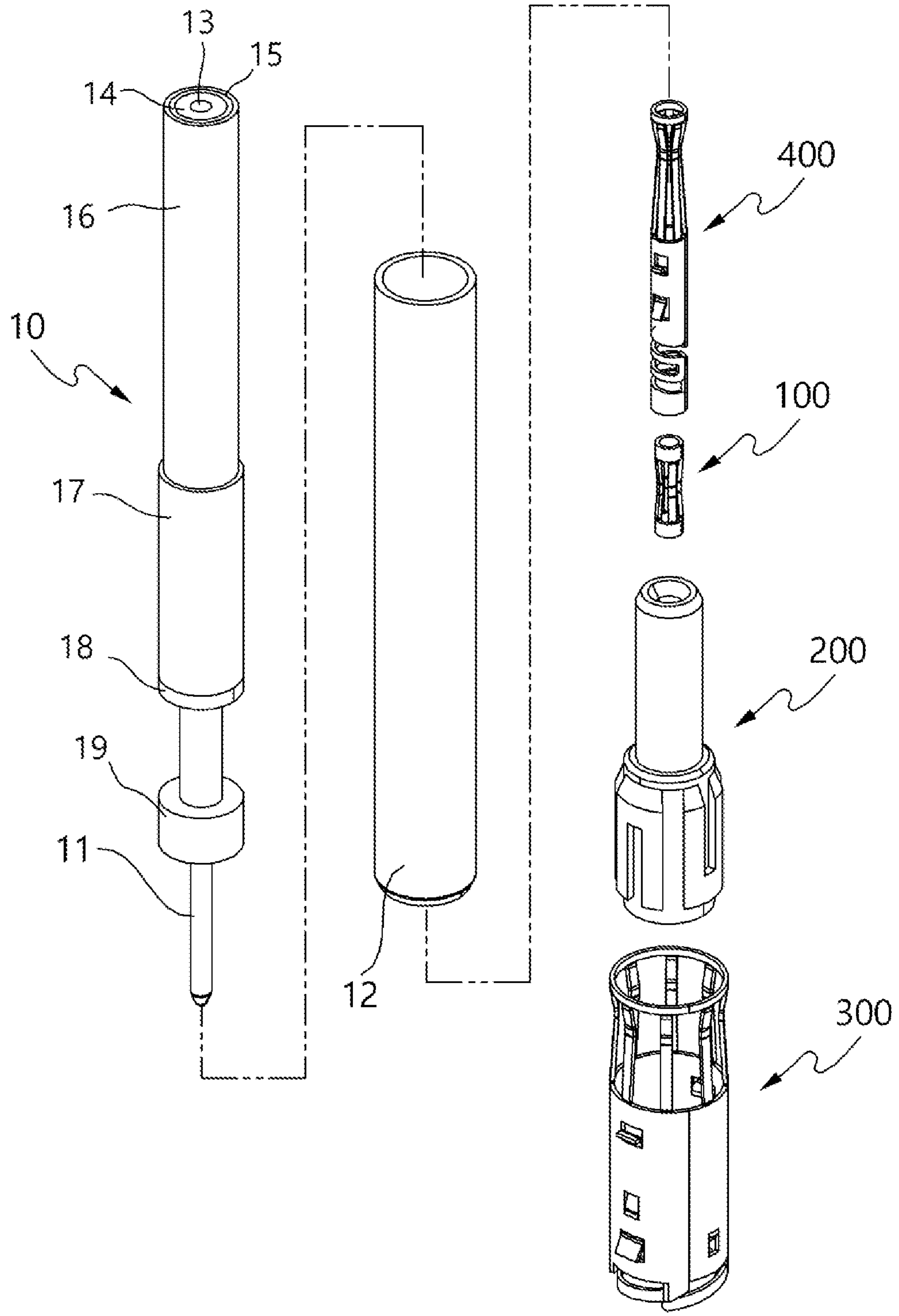
FIG. 3 is an exploded view illustrating the adaptor shown in FIG. 2.

FIG. 2 is a perspective view illustrating the adaptor 20 to which the assembly cable 10 is fastened, and FIG. 3 is an exploded view illustrating the adaptor 20 shown in FIG. 2.

Referring to FIG. 3, the adaptor 20 may include a first member 100, a second member 200, a third member 300, and a contact pin 400.

In the embodiment of the present invention, the contact pin 400 is electrically connected to the signal line 13 through the signal pin 11 of the cable 10 and functions as a pin which transmits a signal but is not limited thereto and may function as a ground pin or power pin when connected to a ground or electrically connected to a power line which transmits a voltage and current.

The first member 100 comes into electrical contact with the contact pin 400. The first member 100 may be disposed inside the contact pin 400. The first member 100 includes a conducting material and compensates impedance corresponding to a shape of the contact pin 400.

The second member 200 is disposed outside the contact pin 400. Part of the second member 200 may be disposed inside the outer conductor 12.

The third member 300 comes into electrical contact with the outer conductor 12 of the cable 10. The third member 300 is disposed outside the second member 200. The third member 300 is coupled to the second member 200. Also, the third member 300 is a conducting material.

The contact pin 400 comes into direct contact with the signal pin 11. The signal pin 11 may be inserted into the contact pin 400. The contact pin 400 comes into electrical contact with the object being tested. A part of the contact pin 400 which comes into electrical contact with the object being tested may be formed to have a restoring force at the time of contracting.

Figure 4:
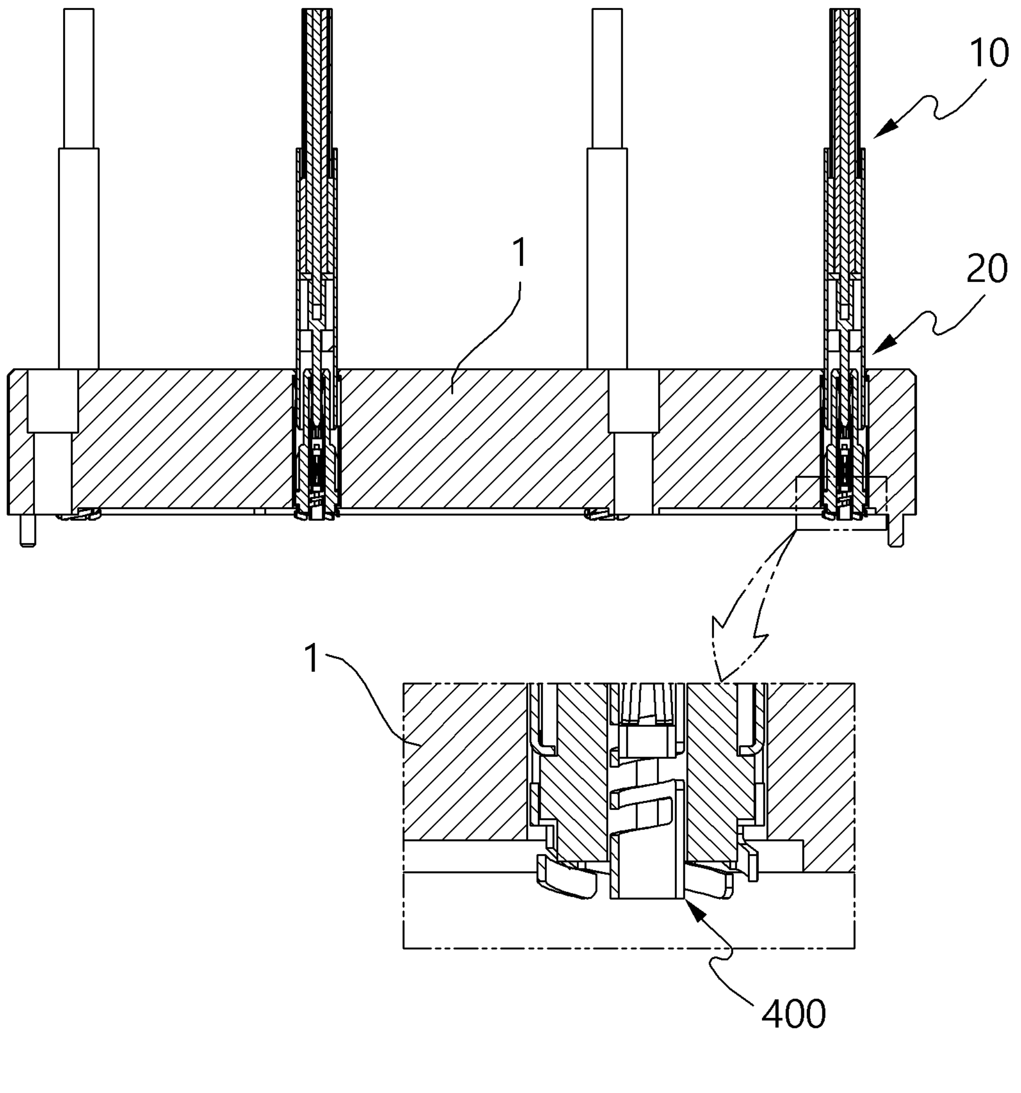
FIG. 4 is a side cross-sectional view of the assembly shown in FIG. 1 in which the adaptors are arranged.

FIG. 4 is a side cross-sectional view of the assembly shown in FIG. 1 in which the adaptors 20 are arranged.

Referring to FIG. 4, an end of the adaptor 20 may protrude from the lower surface of the base 1 and come into contact with the object being tested. The contact pin 400 may protrude from the end of the adaptor 20 and come into contact with the object being tested.

Figure 5:
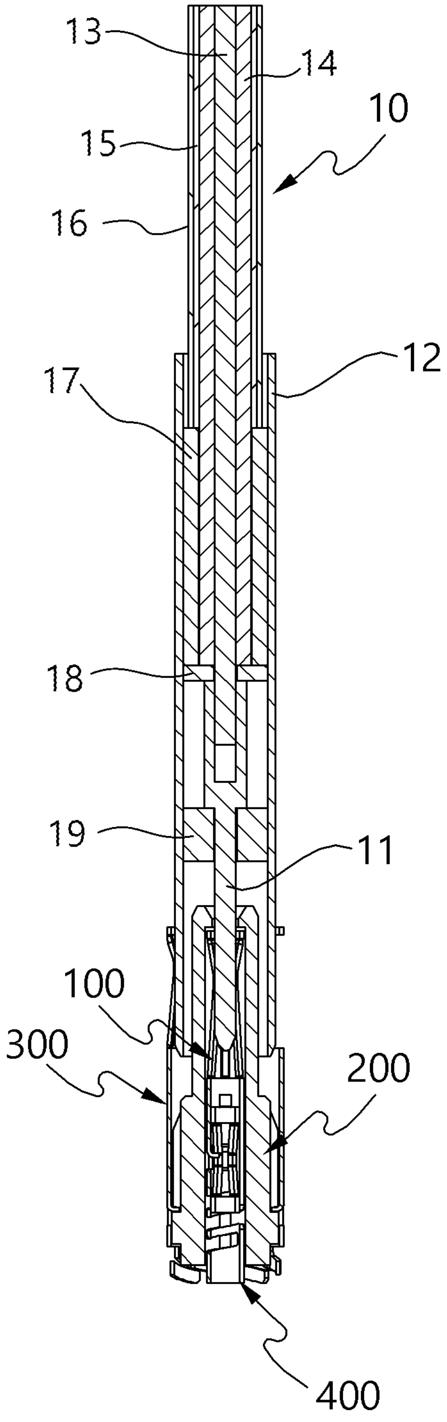
FIG. 5 is a side cross-sectional view of the adaptor on the basis of line A-A of FIG. 2.
Figure 6:
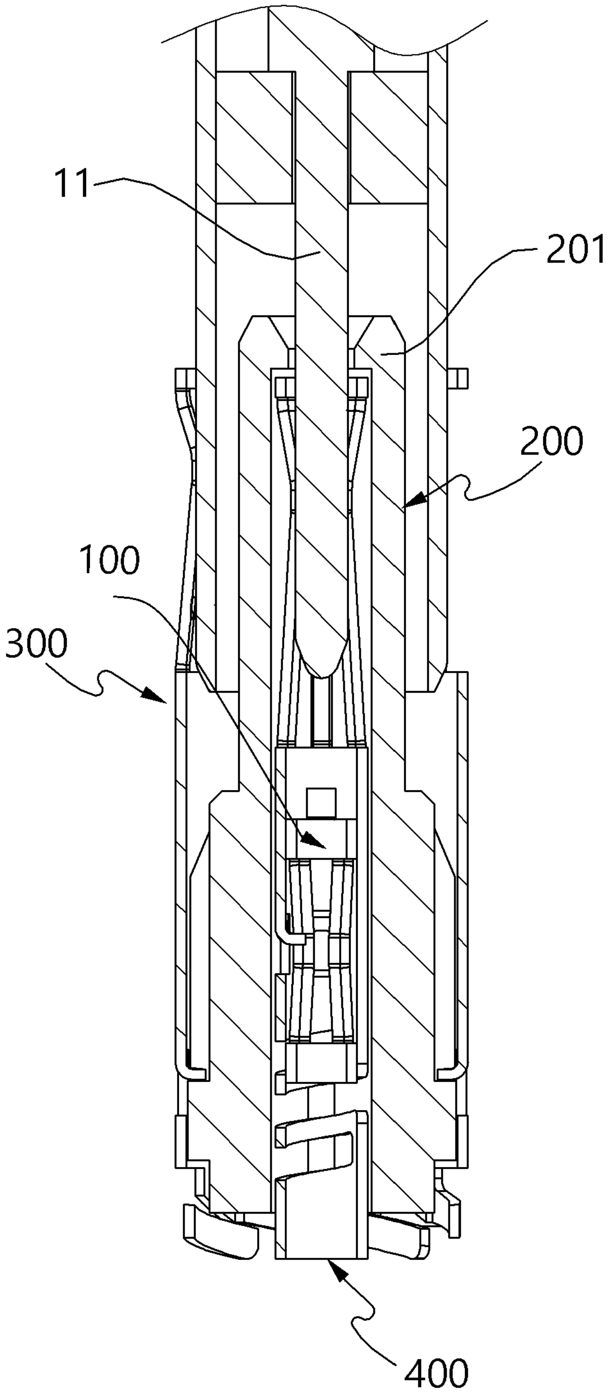
FIG. 6 is a side cross-sectional view of the adaptor.

FIG. 5 is a side cross-sectional view of the adaptor 20 on the basis of line A-A of FIG. 2, and FIG. 6 is a side cross-sectional view illustrating a lower side of the adaptor 20.

Referring to FIGS. 5 and 6, the signal pin 11 of the cable 10 is disposed on an upper side inside the contact pin 400. The second member 200 is formed as a hollow member, and thus the contact pin 400 is located thereinside. Since a stepped structure 201 is disposed on an upper end of the inside of the second member 200, there is an advantage that the contact pin 400 is caught by the stepped structure 201 and not pushed back when the contact pin 400 is pushed. The third member 300 is coupled to an outside the second member 200.

Figure 7:
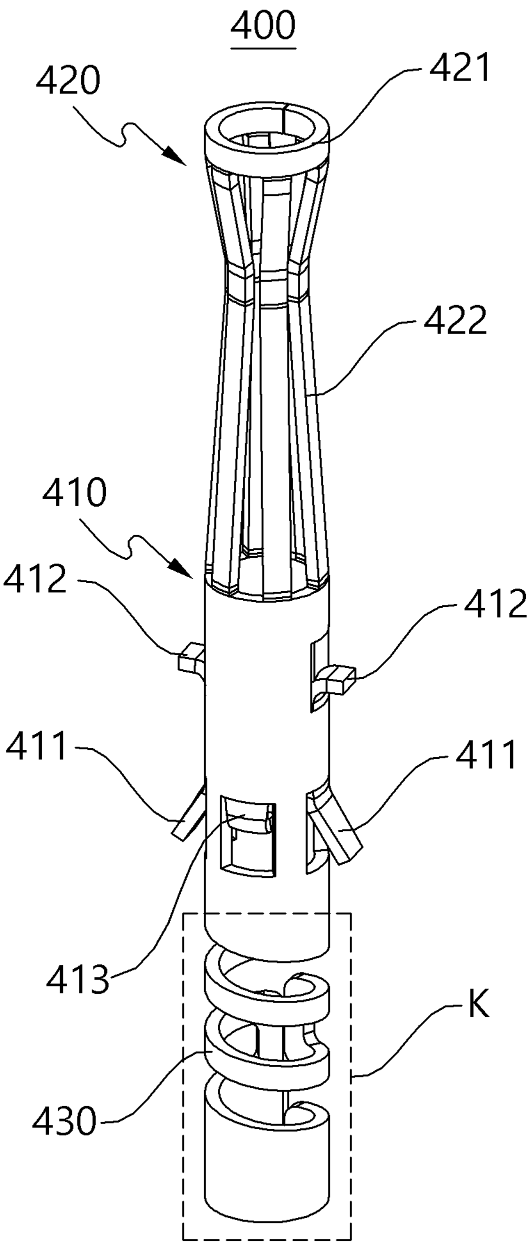
FIG. 7 is a perspective view illustrating a contact pin.

FIG. 7 is a perspective view illustrating the contact pin 400.

Referring to FIG. 7, the contact pin 400 may include a first body 410, a first contact portion 420, and a second contact portion 430.

The first body 410 is a cylindrical member and coupled to the second member 200. The first body 410 may include a first protrusion 411 and a second protrusion 412. The first protrusion 411 and the second protrusion 412 are sections formed by cutting parts of the first body 410 and may be bent and protrude outward. The first protrusion 411 may be bent downward toward outside of the first body 410. The second protrusion 412 may be bent upward toward outside of the first body 410.

The first protrusion 411 and the second protrusion 412 may come into elastic contact with an inner circumferential surface of the second member 200 and increase a coupling property of the contact pin 400 to the second member 200. The first protrusion 411 and the second protrusion 412 are symmetrically arranged on the basis of a center of the first body 410 so as to facilitate coaxial coupling of the contact pin 400 and the second member 200 to the cable 10.

The first body 410 may include a third protrusion 413. The third protrusion 413 is a section obtained by cutting a part of the first body 410 and may be bent inward and may protrude toward an inside of the first body 410. The third protrusion 413 performs a function of preventing the first member 100 from being detached from the contact pin 400. In one or more embodiments, the third protrusion 413 is disposed in a part concavely bent toward an inside of a column 130 of the first member 100 so as to prevent the first member 100 from being vertically detached from an inside of the contact pin 400.

The first contact portion 420 is a part which comes into contact with the signal pin 11 of the cable 10. The first contact portion 420 is disposed to extend upward from the first body 410. The first contact portion 420 may include a first ring-shaped frame 421 and a plurality of first legs 422. The first ring-shaped frame 421 may be disposed to be spaced apart from the first body 410 in a longitudinal direction (z-axis), and the plurality of first legs 422 may extend from the first ring-shaped frame 421 and may be connected to an upper surface of the first body 410. The first legs 422 may be arranged at certain intervals along a circumferential direction of the first ring-shaped frame 421.

The first legs 422 may have a bent shape to be partially located more inward than the first ring-shaped frame 421. For example, the plurality of first legs 422 may have a shape in which an intermediate area is formed to be concave in the longitudinal direction (z-axis). The first legs 422 may include an elastically deformable material. The plurality of first legs 422 may have the same size and shape.

The signal pin 11 of the cable 10 passes through the first ring-shaped frame 421 and is inserted into the first contact portion 420 along the first legs 422. The contact pin 400 may come into coaxial contact with the signal pin 11 through the plurality of first legs 422.

Figure 8:
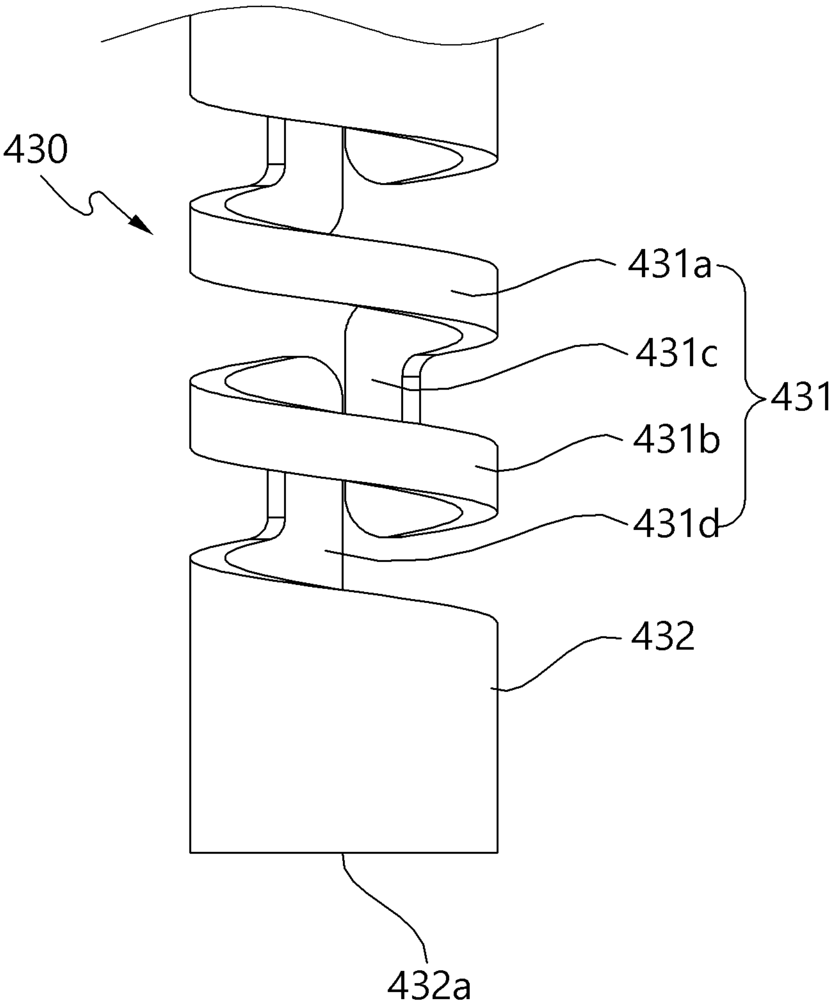
FIG. 8 is an enlarged view illustrating part k of FIG. 7.

FIG. 8 is an enlarged view illustrating part k of FIG. 7.

Referring to FIGS. 7 and 8, the contact pin 400 may include the second contact portion 430 which comes into contact with the object being tested. The second contact portion 430 may include an elastic portion 431 and a tip portion 432. The elastic portion 431 is formed to have a spiral shape to provide elasticity to the contact portion 430 like a spring. In one or more embodiments, the elastic portion 431 may include a first elastic piece 431*a* and a second elastic piece 431*b* which are formed integrally. Also, the elastic portion 431 may include a first connection portion 431*c* which is linearly formed and connects the first elastic piece 431*a* to the second elastic piece 431*b* and a second connection portion 431*d* which is linearly formed and connects the second elastic piece 431*b* to the tip portion 432. The elastic portion 431 provides a restoring force when the contact pin 400 comes into contact with the object being tested.

Figure 9:
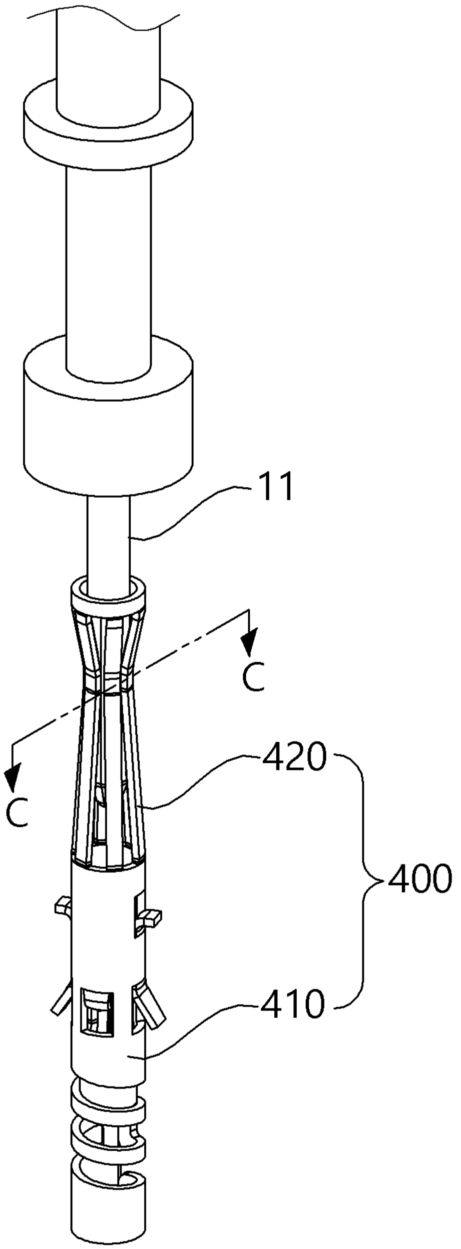
FIG. 9 is a view illustrating a contact pin in which a signal pin of the cable is inserted.
Figure 10:
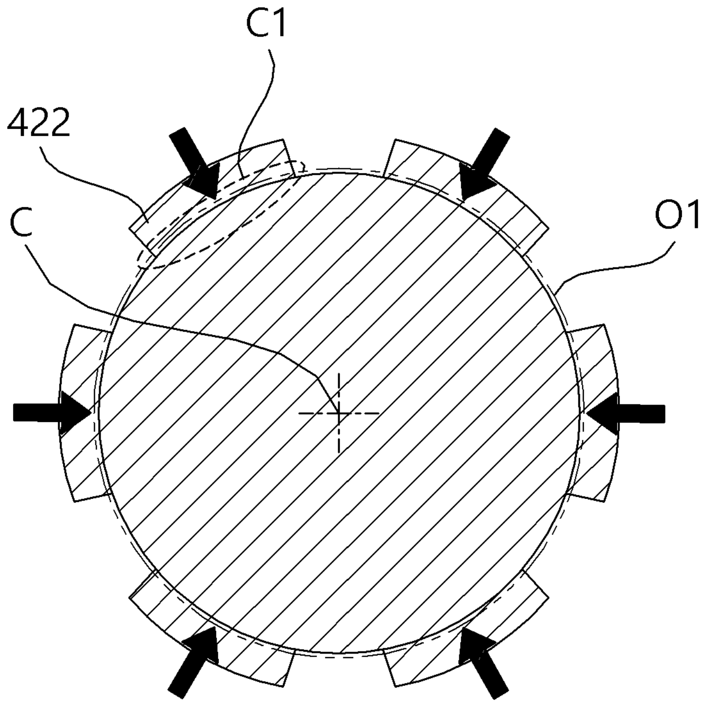
FIG. 10 is a cross-sectional view of the contact pin on the basis of line C-C shown in FIG. 9.

FIG. 9 is a view illustrating the contact pin 400 in which the signal pin 11 of the cable 10 is inserted, and FIG. 10 is a cross-sectional view of the contact pin 400 on the basis of line C-C shown in FIG. 9.

Referring to FIGS. 9 and 10, part of a bent area of the first leg 422 comes into elastic contact with the signal pin 11 so as to form a first contact point C1. Since the plurality of first legs 422 are arranged to be rotationally symmetrical on the basis of a center C of the cable 10, a plurality of such first contact points C1 are arranged at same intervals along a circumferential direction of the signal pin 11. Also, the plurality of first contact points C1 may be arranged on a first circumference O1 formed on the basis of the center C of the cable 10. Also, the plurality of first contact points C1 may be arranged at the same positions in the longitudinal direction (z-axis) of the signal pin 11.

Since the plurality of first legs 422 come into elastic contact with the signal pin 11 in a radial direction as described above, the adaptor 20 is not biased toward the center C of the cable 10 and is coaxially coupled to the cable 10 so as to facilitate impedance matching.

Figure 11:
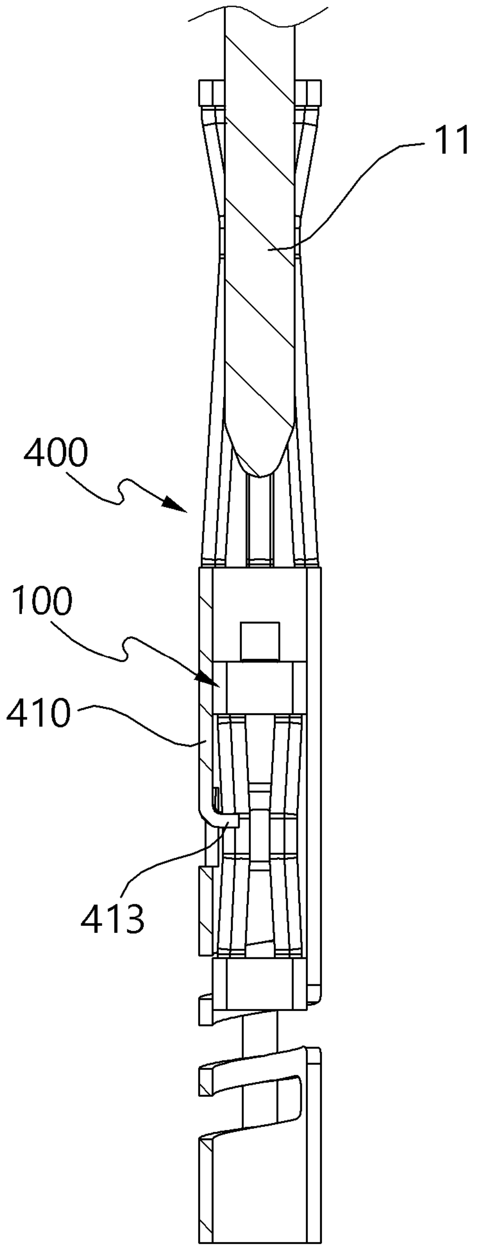
FIG. 11 is a side cross-sectional view of the adaptor in which a first member is disposed inside the contact pin.
Figure 12:
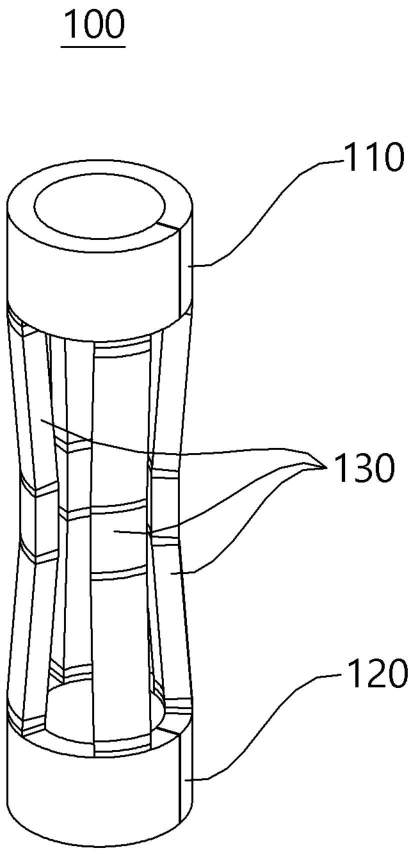
FIG. 12 is a view illustrating the first member.

FIG. 11 is a side cross-sectional view of the adaptor in which the first member 100 is disposed inside the contact pin 11, and FIG. 12 is a view illustrating the first member 100.

Since the elastic portion 430 of the contact pin 400 has a shape which forms an air gap between the first elastic piece 431*a* and the second elastic piece 431*b* and has an influence on impedance, the first member 100 which is conductive is inserted into the contact pin 400 for compensation for impedance.

The first member 100 may include an upper ring 110, a lower ring 120, and a plurality of such columns 130.

The upper ring 110 and the lower ring 120 come into contact with an inner surface of the contact pin 400. The plurality of columns 130 connect the upper ring 110 to the lower ring 120. The plurality of columns 130 are arranged to be spaced at same intervals in a circumferential direction. The respective columns 130 may be partially formed to be concavely bent inward. The first member 100 having the above shape may have a structure elastically deformable in the longitudinal direction (z-axis) to increase a coupling force with the contact pin 400.

As described above, there is an effect of compensating negative influences such as a decline in impedance which may occur due to the air gap between the elastic pieces of the elastic portion 430 using the first member 100 which is conductive and includes the plurality of columns 130 coaxially formed.

Figure 13:
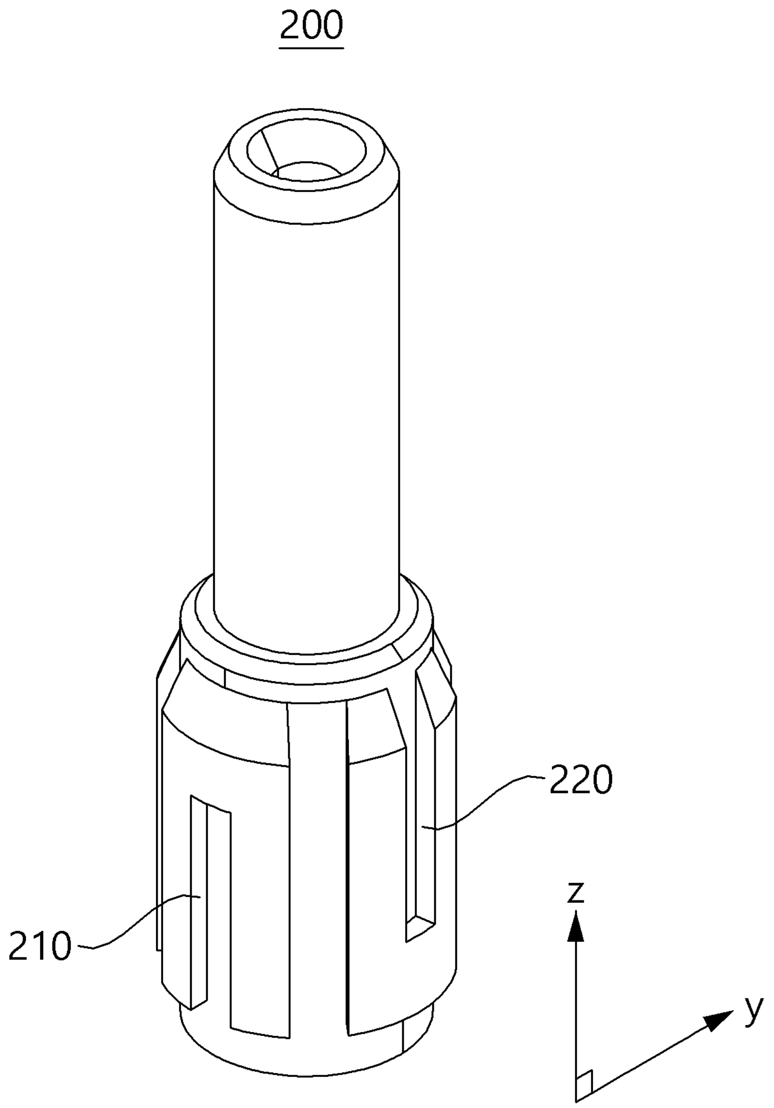
FIG. 13 is a view illustrating a second member.

FIG. 13 is a view illustrating the second member 200.

Referring to FIG. 13, the second member 200 may include a slot portion 210 and 220. The slot portion 210 and 220 is concavely formed in an outer surface of the second member 200. The slot portion 210 and 220 may be disposed along the longitudinal direction (z-axis). The slot portion 210 and 220 may include a first slot 210 and a second slot 220. The first slot 210 may have an inlet which is formed downward. On the other hand, the second slot 220 may have an inlet which is formed upward. The first slot 210 and the second slot 220 may be alternately arranged at same intervals along a circumferential direction of the contact pin 400.

A fifth protrusion 314 (refer to FIG. 14) of the third member 300 is disposed in the first slot 210. A sixth protrusion 315 (refer to FIG. 14) of the third member 300 is disposed in the second slot 220.

Figure 14:
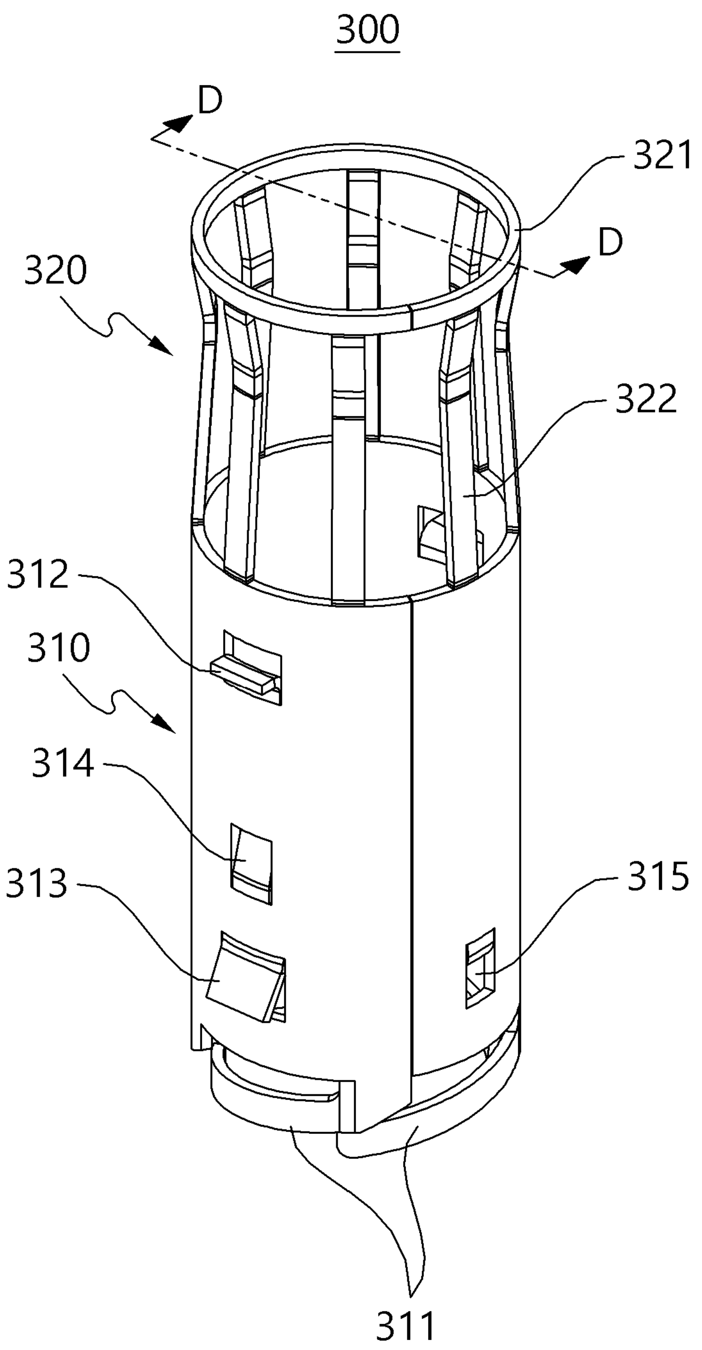
FIG. 14 is a view illustrating a third member.
Figure 15:
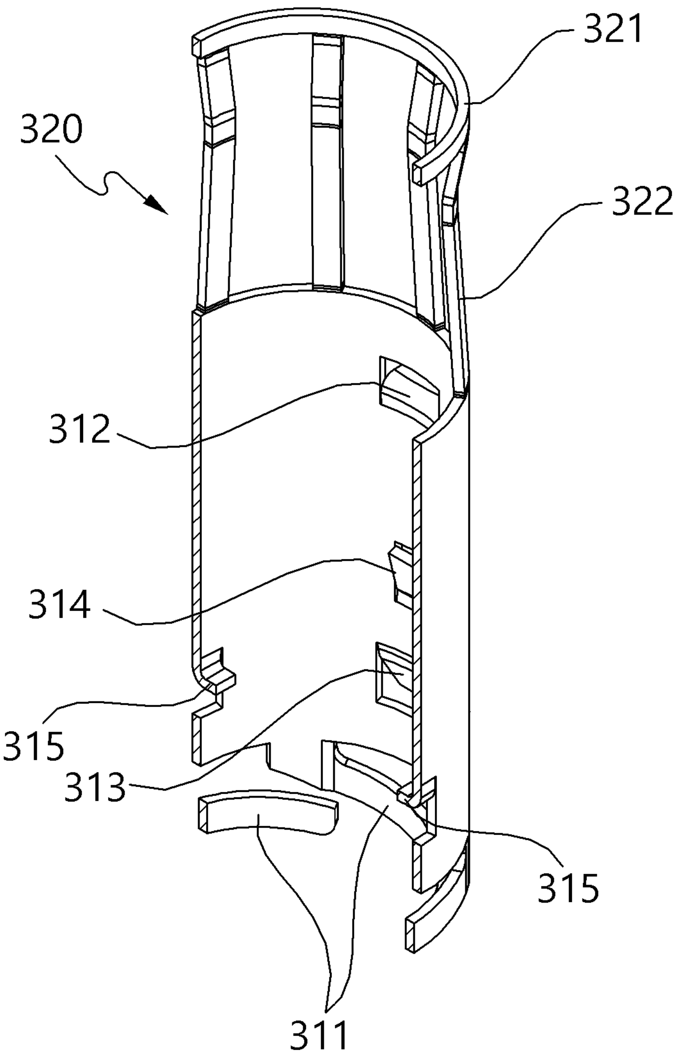
FIG. 15 is a side cross-sectional view of the third member.

FIG. 14 is a view illustrating the third member 300, and FIG. 15 is a side cross-sectional view of the third member 300.

Referring to FIGS. 14 and 15, the third member 300 may include a second body 310 and a third contact portion 320.

The second body 310 is a cylindrical member and coupled to the second member 200. The second body 310 may include a third protrusion 312 and a fourth protrusion 313. The third protrusion 312 and the fourth protrusion 313 are sections formed by cutting parts of the second body 310 and may be bent and protrude outward. The fourth protrusion 313 may be bent downward toward outside of the second body 310. The third protrusion 312 may be bent upward toward outside of the second body 310.

The third protrusion 312 and the fourth protrusion 313 may come into contact with an inner surface of the hole 1*a* of the base 1 and secure a fixing force of the adaptor 20 and the base 1.

Meanwhile, the second body 310 may include the fifth protrusion 314 and the sixth protrusion 315 as protrusions disposed in the slot portion 210 and 220. The fifth protrusion 314 and the sixth protrusion 315 are sections formed by cutting parts of the second body 310 and may be bent inward and protrude toward inside of the second body 310. The fifth protrusion 314 may be bent upward toward inside of the second body 310. The sixth protrusion 315 may be bent downward toward inside of the second body 310.

The fifth protrusion 314 may be disposed in the first slot 210 of the second member 200, and the sixth protrusion 315 may be disposed in the second slot 220 of the second member 200. The fifth protrusion 314 and the sixth protrusion 315 may secure a coupling property of the second member 200 and the third member 300, prevent the third member 300 from being separated from the second member 200 in the longitudinal direction (z-axis), and prevent a slip occurring between the second member 200 and the third member 300 in a circumferential direction.

The second body 310 may include a plurality of elastic pieces 311. Each of the elastic pieces 311 extends from a lower surface of the second body 310 and is disposed to be spaced apart from the lower surface of the second body 310. The elastic pieces 311 may be formed to have a spiral shape. The plurality of elastic pieces 311 may be disposed to be spaced apart from each other. A lower end of the elastic piece 311 comes into contact with the object being tested.

When a load is added in the longitudinal direction (z-axis), the elastic piece 311 contracts in the longitudinal direction (z-axis) and provides a restoring force. When coupled to the object being tested, the elastic piece 311 having the spiral shape contracts in the longitudinal direction to have an approximately circular-ring shape to come into coaxial contact with the object being tested so that there is an effect of facilitating impedance matching.

The third contact portion 320 is a part which comes into contact with the outer conductor 12 of the cable 10. The third contact portion 320 is disposed to extend upward from the second body 310. The third contact portion 320 may include a second ring-shaped frame 321 and a plurality of second legs 322. The second ring-shaped frame 321 may be disposed to be spaced apart from the second body 310 in the longitudinal direction (z-axis), and the plurality of second legs 322 may extend from the second ring-shaped frame 321 and may be connected to an upper surface of the second body 310. The second legs 322 may be arranged at certain intervals along a circumferential direction of the second ring-shaped frame 321.

The second legs 322 may have a bent shape to be partially located more inward than the second ring-shaped frame 321. For example, the plurality of second legs 322 may have a shape in which an intermediate area is formed to be concave in the longitudinal direction (z-axis). The second legs 322 may include an elastically deformable material. The plurality of second legs 322 may have the same size and shape.

The outer conductor 12 of the cable 10 passes through the second ring-shaped frame 321 and is inserted into the third contact portion 320 along the second legs 322.

Figure 16:
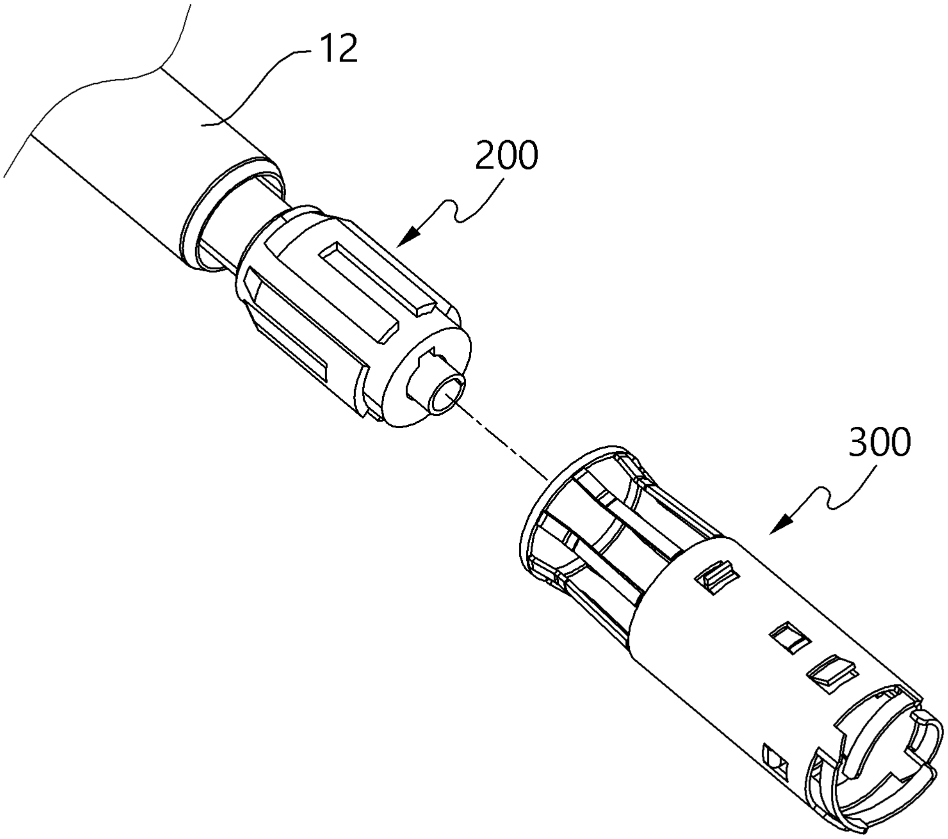
FIG. 16 is a view illustrating the third member which is mounted on the cable.
Figure 17:
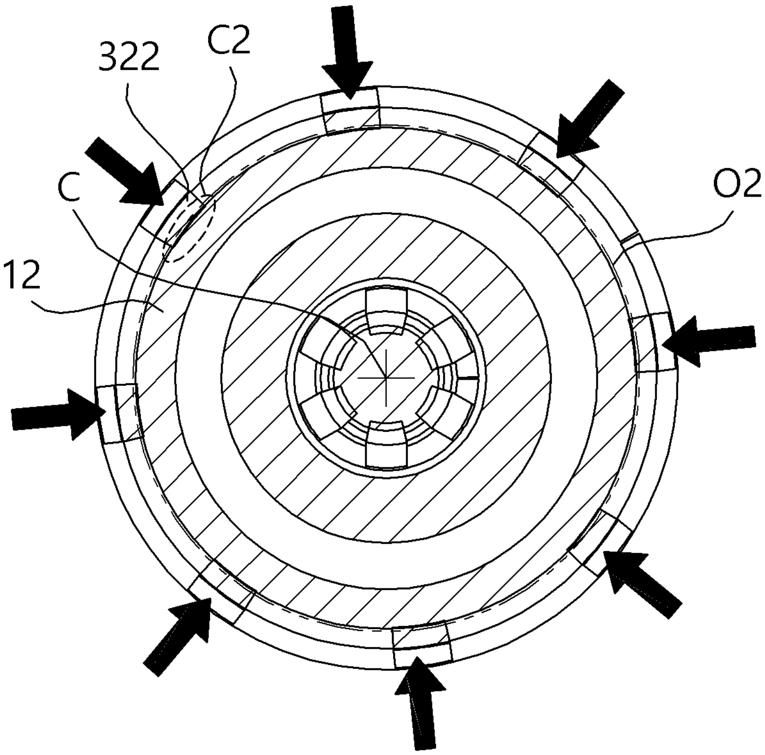
FIG. 17 is a cross-sectional view of the third member on the basis of line B-B shown in FIG. 2.

FIG. 16 is a view illustrating the third member 300 which is mounted on the cable 10, and FIG. 17 is a cross-sectional view illustrating the third member 300 on the basis of line B-B shown in FIG. 2.

Referring to FIGS. 16 and 17, while the second member 200 is mounted on the cable 10, the third member 300 is mounted. When the third member 300 is mounted, the third member 300 may be disposed outside the second member 200 and the outer conductor 12.

Part of a bent area of the second leg 322 comes into elastic contact with the outer conductor 12 so as to form a second contact point C2. Since the plurality of second legs 322 are arranged to be rotationally symmetrical on the basis of the center of the cable 10, a plurality of such second contact points C2 are arranged at same intervals along a circumferential direction of the outer conductor 12. Also, the plurality of second contact points C2 may be arranged on a second circumference O2 formed on the basis of the center C of the cable 10. Also, the plurality of second contact points C2 may be arranged at the same positions in the longitudinal direction (z-axis) of the outer conductor 12.

Since the plurality of second legs 322 come into elastic contact with the outer conductor 12 in a radial direction as described above, the adaptor 20 is not biased toward the center of the cable 10 and is coaxially coupled to the cable 10 so as to facilitate impedance matching.

According to the embodiment of the present invention, since the signal pin 11 is supported in the radial direction by the plurality of first legs 422 and the outer conductor 12 which is connected to the ground is supported by the plurality of second legs 322 in the radial direction, there is an advantage that the adaptor 20 can coaxially connect the ground (outer conductor 12) and the signal pin 11 of the cable 10 at the same time so as to facilitate impedance matching with the object being tested.

The cable adaptor 20 according to one exemplary embodiment of the present invention has been described above in detail with reference to the attached drawings.

According to embodiments, an adaptor is configured to come into contact with and support a signal pin of a cable in a radial direction and to come into contact with and support an outer conductor of the cable in a radial direction so as to easily implement the cable and the adaptor which are coaxial.

According to embodiments, since a conductive first member having a coaxial shape is disposed inside the contact pin, there is an advantage of compensating negative influences which may occur due to a shape of the contact pin in impedance matching.

According to embodiments, since the signal pin is guided along first legs while inserted into a first contact portion of the contact pin so as to form a plurality of first contact points formed along a circumferential direction, there is an advantage of easily implementing the cable and the adaptor which are coaxial.

According to embodiments, since a third member is guided along second legs while inserted into a second contact portion so as to form a plurality of second contact points formed along a circumferential direction, there is an advantage of easily implementing the cable and the adaptor which are coaxial.

According to embodiments, since the adaptor remains in coaxial contact with not only the signal pin but the outer conductor of the cable, there is an advantage of easy impedance matching with an object being tested.

The above-described embodiment of the present invention should be understood as being exemplary and not limitative in every aspect, and the scope of the present invention will be defined by the following claims rather than the above detailed description. Also, not only the meaning and scope of the claims but all changeable or modifiable forms derived from the equivalent concept thereof should be construed as being included in the scope of the present invention.

What is claimed is:

1. A cable adaptor which is connected to a cable including an outer conductor, comprising:

a contact pin which comes into contact with a signal pin of the cable;

a first member which is conductive and disposed inside and coupled to the contact pin;

a second member disposed outside and coupled to the contact pin; and a third member which is conductive and disposed outside the second member, wherein the contact pin comprises a first body coupled to the second member, a first contact portion which is conductive and extends from one side of the first body to come into contact with the signal pin, and a second contact portion which extends from the other side of the first body and comes into contact with an object being tested, wherein the third member comprises a second body coupled to the second member and a third contact portion which extends from the second body and comes into contact with the outer conductor, wherein a plurality of first contact points of the signal pin and the first contact portion are arranged at same intervals along a circumferential direction of the signal pin, and wherein a plurality of second contact points of the outer conductor and the third contact portion are arranged at same intervals along a circumferential direction of the outer conductor.

2. The adaptor of claim 1, wherein the plurality of first contact points are arranged at same positions in a longitudinal direction of the signal pin, and wherein the plurality of second contact points are arranged at same positions in a longitudinal direction of the outer conductor.

3. The adaptor of claim 1, wherein the first contact portion comprises a first ring-shaped frame and a plurality of first legs which extend from the first ring-shaped frame and are connected to the first body, wherein the plurality of first legs are concavely bent inward and each come into elastic contact with the signal pin at the first contact points, wherein the third contact portion comprises a second ring-shaped frame and a plurality of second legs which extend from the second ring-shaped frame and are connected to the second body, and wherein the plurality of second legs are concavely bent inward and each come into elastic contact with the outer conductor at the second contact points.

4. The adaptor of claim 1, wherein the first member comprises an upper ring and a lower ring which come into contact with an inner surface of the contact pin and a plurality of columns arranged at same intervals in a circumferential direction while connecting the upper ring to the lower ring.

5. The adaptor of claim 1, wherein the second body comprises a plurality of spiral elastic pieces which extend from a lower surface of the second body and are disposed to be spaced apart from the lower surface of the second body.

6. The adaptor of claim 1, wherein the second contact portion comprises an elastic portion which provides a restoring force at the time of contracting and a tip portion which extends from the elastic portion and comes into contact with the object being tested.

7. The adaptor of claim 1, wherein the second member comprises a slot portion concavely formed in an outer surface of the second member along a longitudinal direction of the second member, and wherein the third member comprises a protrusion which protrudes from an inner surface of the third member and is disposed in the slot portion.

8. The adaptor of claim 7, wherein the slot portion comprises a first slot and a second slot, wherein the first slot and the second slot are alternately arranged along a circumferential direction of the second member, and wherein an inlet of the first slot is opposite to an inlet of the second slot on the basis of a longitudinal direction.

* * * * *